United States Patent
Krishna et al.

(10) Patent No.: US 6,330,248 B1
(45) Date of Patent: Dec. 11, 2001

(54) ARRANGEMENT FOR TRANSMITTING DATA PACKETS FROM A MEDIA ACCESS CONTROLLER ACROSS MULTIPLE PHYSICAL LINKS

(75) Inventors: Gopal S. Krishna, San Jose; Mohan V. Kalkunte; Shashank C. Merchant, both of Sunnyvale, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/985,719

(22) Filed: Dec. 5, 1997

(51) Int. Cl.[7] .................................................. H04L 12/413
(52) U.S. Cl. ............................................ 370/447; 370/462
(58) Field of Search .................................. 370/445, 431, 370/433, 473, 389, 401, 397, 412, 359, 465, 414, 463, 419, 420; 395/280

(56) References Cited

U.S. PATENT DOCUMENTS

| | | | |
|---|---|---|---|
| 5,065,396 | * 11/1991 | Castellano et al. | 370/536 |
| 5,517,495 | * 5/1996 | Lund et al. | 370/412 |
| 5,546,543 | * 8/1996 | Yang et al. | 705/235 |
| 5,633,865 | * 5/1997 | Short | 370/412 |
| 5,680,400 | 10/1997 | York . | |
| 5,737,108 | * 4/1998 | Bunch et al. | 359/122 |
| 5,812,554 | * 9/1998 | Kadambi et al. | 370/473 |
| 5,825,755 | * 10/1998 | Thompson et al. | 370/296 |
| 5,881,074 | * 3/1999 | Rao | 371/431 |
| 5,883,894 | * 3/1999 | Patel et al. | 370/438 |
| 5,892,926 | * 4/1999 | Witkowski et al. | 395/280 |
| 5,907,553 | * 5/1999 | Kelly et al. | 370/433 |
| 5,923,663 | * 7/1999 | Bontemps et al. | 370/445 |
| 5,940,401 | * 8/1999 | Frazier, Jr. et al. | 370/445 |
| 5,949,788 | * 9/1999 | Friedman et al. | 370/431 |
| 6,002,692 | * 12/1999 | Wills | 370/465 |

FOREIGN PATENT DOCUMENTS

| | | |
|---|---|---|
| 0 596 736 A1 | 5/1994 | (EP) . |
| 2 315 391 A | 1/1998 | (GB) . |
| WO 96/07132 | 3/1996 | (WO) . |
| WO 96/08120 | 3/1996 | (WO) . |

* cited by examiner

*Primary Examiner*—Chau Nguyen
*Assistant Examiner*—Chiho Andrew Lee

(57) ABSTRACT

A gigabit network node having a media access controller outputting data frames at gigabit rates uses multiple 100 MB/s media interface links coupled to a physical interface to enable implementation of a gigabit network using low cost data links. A modified reconciliation layer, also referred to as a media interface, receives a data frame from a gigabit MAC and selectively stores the received packet data into one of a plurality of transmit buffers associated with the respective 100 MB/s media interface links, according to a path selection arbitration logic in the media interface. The path selection arbitration logic may operate according to an equal priority scheme, where each received data frame is routed according to a round-robin scheme. A high priority/low priority scheme may also be used by the path selection arbitration logic, where data frames identified as high priority are temporarily stored in a high priority transmit buffer, and then forwarded to a selected one of the transmit buffers associated with a corresponding 100 MB/s media interface link before outputting data frames from a low priority buffer.

18 Claims, 4 Drawing Sheets

ARRANGEMENT FOR TRANSMITTING DATA PACKETS FROM A MEDIA ACCESS CONTROLLER ACROSS MULTIPLE PHYSICAL LINKS

BACKGROUND OF THE INVENTION

1. Technical Field

The present invention relates to transmitting packet data on a high speed network, more specifically to methods and systems for transmitting data from a media access controller (MAC) layer onto a physical layer of a full-duplex network operating at data rates of at least one gigabit per second.

2. Background Art

Local area networks use a network cable or other media to link stations on the network. Each local area network architecture uses a media access control (MAC) that sends data packets to a physical layer transceiver for transmission on the network media.

The Ethernet protocol ISO/IEC 8802-3 (ANSI/IEEE standard 802.3, 1993 edition) defines a half-duplex media access mechanism that permits all stations to access the network channel with equality. The half-duplex mechanism typically operates at either 10 MB/s, or 100 MB/s. A full-duplex environment has also been proposed for Ethernet networks, referred to as IEEE 802.3x, Full-Duplex with Flow Control—Working Draft (0.3). The full-duplex environment provides a two-way, point-to-point communication link between two networks stations using the switched hub, for example at 100 MB/s, so that two stations can simultaneously transmit and receive Ethernet data packets between each other without collision.

The IEEE 802.3z Task Force is currently defining standards for the operation of a shared (i.e., half-duplex) and full-duplex gigabit Ethernet. The standard will describe a media access control (MAC) layer, a reconciliation layer, a gigabit-media independent interface (GMII), and physical media dependent sublayers that will implement the physical layer (PHY) of the proposed networks. The proposed networks will enable users to implement Ethernet links capable of operating at a data rate of 1 gigabit per second in half-duplex mode and 2 gigabits per second in full-duplex mode.

Currently, the Fast Ethernet standard describes a media independent interface (MII) that is used to connect Fast Ethernet MAC layer devices to the Fast Ethernet devices, enabling users to implement Ethernet links operating at 100 MB/s half-duplex, and 200 MB/s full-duplex.

There currently is no means for users to implement Ethernet links that operate in the range of data rates that exceed 200 MB/s and are lower than 1 gigabit per second. In addition, efforts at implementing a physical data link at gigabit transmission rates is very expensive, since the current state of technology does not permit use of copper links for gigabit data rate transmissions. Hence, only fiber optics can be used to transmit data at gigabit data rates.

One arrangement for implementing physical layer data links that provide gigabit transmission rates is disclosed in commonly assigned, co-pending application Ser. No. 08/912,235, filed Aug. 15, 1997, entitled "ARRANGEMENT FOR TRANSMITTING HIGH SPEED PACKET DATA FROM A MEDIA ACCESS CONTROLLER ACROSS MULTIPLE PHYSICAL LINKS" now U.S. Pat. No. 6,094,439. The disclosed arrangement uses a modified reconciliation layer between the media access controller and the physical layer to transmit at least a portion of the packet data from the media access controller onto multiple media interface links. Use of multiple media interface links provides higher data transmission rates in a cost effective manner by simultaneously transmitting different serial data streams on multiple media interface links, effectively increasing the data rate.

SUMMARY OF THE INVENTION

There is a need for an economic arrangement that specifically identifies implementation functions necessary to enable load allocation of high speed data frames across multiple lower-speed physical links.

There is also a need for an arrangement that specifies an architecture necessary to implement allocation of high speed data frames across multiple transmission links based on the respective priority of the data frames and the availability of the transmission links.

These and other needs are attained by the present invention, where data frames received by a media interface from a high speed media access controller are transmitted on selected media interface links based on path selection arbitration logic in the media interface.

According to one aspect of the present invention, a method of transferring a data frame output from a media access controller of an originating network node to a destination network node, comprises establishing a plurality of first media interface links each configured for transmitting data at a first data rate to respective physical layer links in communication with the destination network node, receiving the data frame in a media interface from the media access controller via a second media interface link at a second data rate higher than the first data rate, and transmitting the received data frame from the media interface for transmission on a selected one of the first media interface links according to a path selection arbitration logic in the media interface. Transmission of data frames received from a media access controller onto media interface links at a lower data rate enables transmission of data from a high speed media access controller in an economic manner by distributing the data frames along multiple lower-rate transmission paths. Moreover, transmission based on the path selection arbitration logic provides a virtual switch fabric below the media access control layer that manages the high speed data frame traffic across multiple lower-speed transmission links.

Another aspect of the present invention provides an apparatus for transmitting a data frame received from a media access controller via a first media interface link at a first transmission rate, comprising a plurality of transmit buffers configured for storing data to be output to a respective plurality of second media interface links, the second media interface links each configured for sending and receiving data at a second data rate less than the first data rate, a first media interface controller having path selection arbitration logic for selectively storing the received data frame in a selected one of the transmit buffers, and a second media interface controller configured for outputting the data stored in each of the transmit buffers based on a corresponding number of stored bytes exceeding a prescribed threshold and an availability of the corresponding second media interface link.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment enables a media implementation of gigabit networks using multiple 100 MB/s PHY technology. Since 100 MB/s PHY technology is readily available and cost effective, the 100 MB/s links provide an inexpensive and transparent solution for applications needing higher bandwidth and quality of service options. Moreover, the scaleable link is transparent to the user's application, system and device drivers, enabling a user to seamlessly migrate to full gigabit speeds by simply replacing the disclosed media interface and corresponding physical layer with a gigabit compliant implementation, once available in the technology.

The disclosed arrangements are directed to implementation of an Ethernet link having scaleable speeds from 200 MB/s to gigabit rates in 200 MB/s steps, using existing 100 MB/s physical layer (PHY) technology. Use of multiple links enables parallel transmissions of different data frames (i.e., data packets) to increase the effective data rate, for example using ten (10) 100 MB/s physical links to produce one virtual GB/s link.

Figure 1:
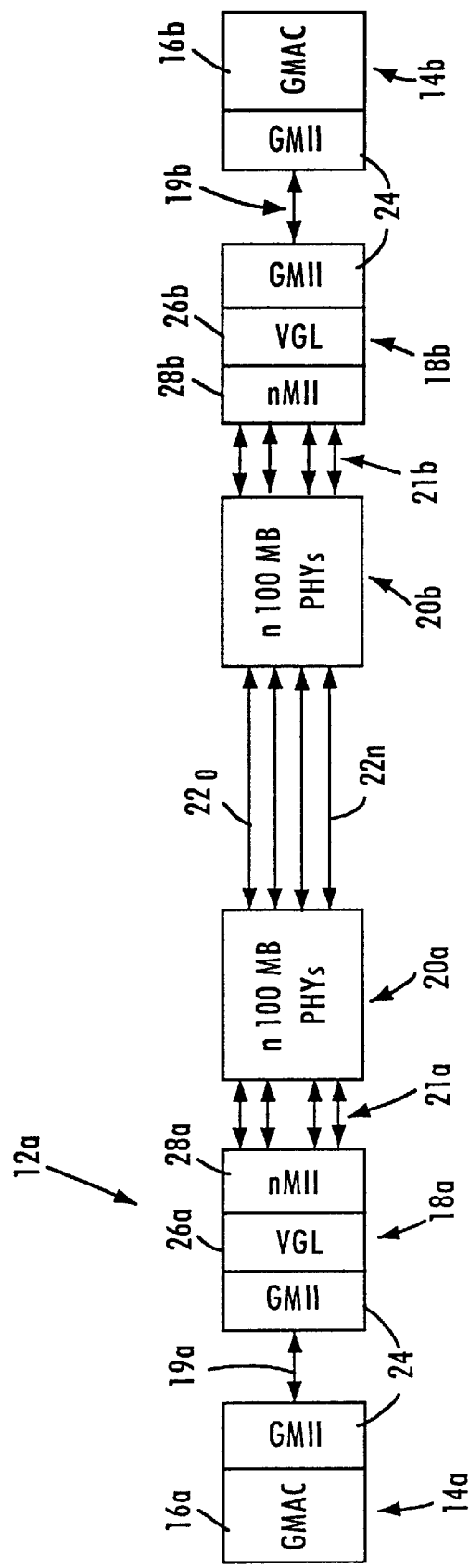
FIG. 1 is a block diagram illustrating an arrangement for transmitting packet data across a high speed data network according to an embodiment of the present invention.
Figure 5:
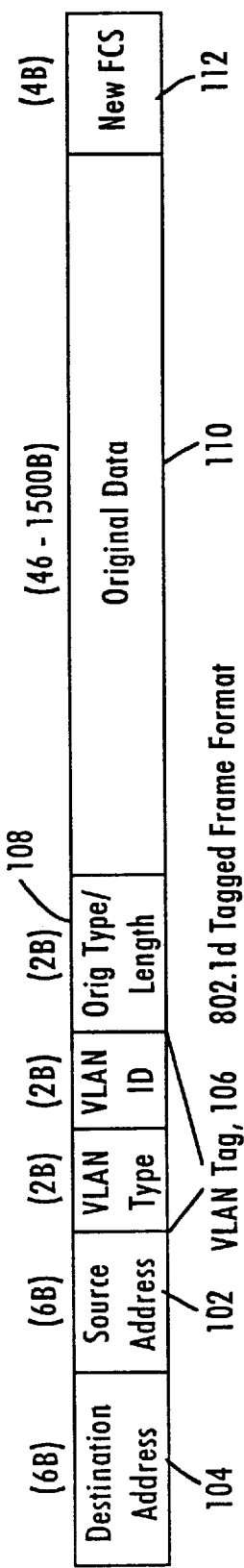
FIG. 5 is a diagram illustrating a data frame structure that may include priority information for transmission on high priority links.

FIG. 1 is a block diagram illustrating the use of multiple layer links in order to provide gigabit transmission rates using 100 MB/s data links according to an embodiment of the present invention. Each network node 12 includes a protocol layer and a device driver (not shown), and a gigabit media access controller (GMAC) layer 14 having a gigabit MAC (GMAC) core 16 compliant with the gigabit Ethernet standards proposed by the IEEE 802.3z Working Group. Each network node 12 also includes a special reconciliation layer 18, also referred to as a generic media interface, which interfaces with media interface link 19 to the gigabit MAC 18 and provides service functions required to distribute, multiplex, demultiplex, and aggregate traffic via a plurality of 100 MB/s media interface links 21 to and from at least one 100 MB/s physical layer (PHY) device 20 providing a plurality of 100 MB/s media interface links $22_0$, $22_1$, $22_2$, to $22_n$. As shown in FIG. 1, the special reconciliation layer 18 and the GMAC layer 14 include gigabit speed media independent interfaces (GMII) 24 for sending and receiving IEEE 802.3 compliant data packets, shown in FIG. 5, for example on a per-byte basis at 125 MB/s via the media interface link 19.

The GMAC 16 generates a data packet, also referred to as a data frame, according to IEEE 802.3 protocol. The GMAC 16 then outputs the data packet of FIG. 5 including preamble, header (including source and destination addresses 102 and 104, optional VLAN tag 106, packet type/length field 108), payload data field 110, and cyclic redundancy check (CRC) or frame check sequence (FCS) field 112 to the reconciliation layer 18 (i.e., the media interface) via the GMII interface 24. The reconciliation layer 18 includes a virtual gigabit layer 26 configured for receiving the data packet from the GMII interface 24 at the gigabit data rate, and configured for transmitting the received data frame for transmission on a selected one of the media interface links $22_0$–$22_n$. Specifically, the virtual gigabit layer outputs each data frame to a selected one of a plurality of media independent interfaces (MII), shown collectively in FIG. 1 as nMII 28. As recognized in the art, each of the MIIs 28 provides a 100 MB/s full duplex connection via a corresponding media interface link 21 to the physical layer device 20 for transmission and reception across a corresponding physical layer link 22. The physical layer devices 20 may be of type 100BASE-TX, 100BASE-T4, or 100BASE-FX, as desired.

Figure 2:
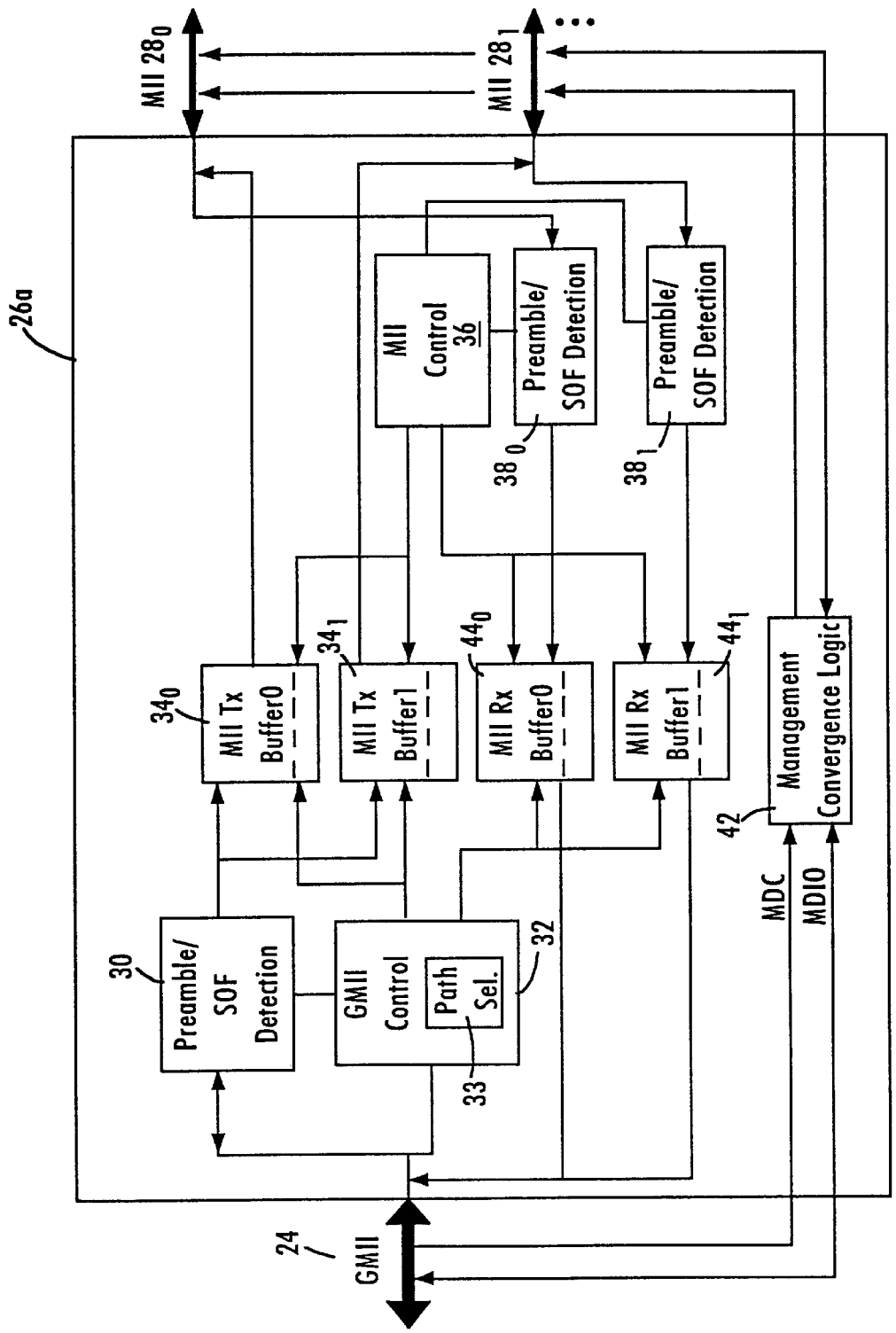
FIG. 2 is a block diagram illustrating in detail the virtual gigabit layer for transferring data frames from a media access controller to multiple media interface links according to a first embodiment of the present invention.

FIG. 2 is a block diagram illustrating in detail one of the virtual gigabit layers 26a of FIG. 1 according to a first embodiment of the present invention. As shown in FIG. 2, the VGL 26a includes a preamble detection circuit 30 configured for detecting a preamble from the GMAC 16a via the GMII 24 indicating a start of packet data at a gigabit data rate. The VGL 26a also includes a GMII control circuit 32 having a path selection, arbitration logic 33, a plurality of MII transmit buffers 34, an MII control 36, a plurality of 100 MB/s preamble detection circuits 38, and management convergence logic 42 configured for supplying a management data clock (MDC) and management data (MDIO) between the GMII 24 and the multiple 100 MB/s MII links 28. The VGL 26 also includes a plurality of MII receive buffers 44 for data received from the MIIs 28 to be output to the GMII 24.

As shown in FIG. 2, a data frame output by the GMAC 16a is received by the VGL 26a via the GMII 24 across the gigabit media interface link 19a. The preamble detection circuit 30 detects a preamble on the gigabit packet on the GMII interface 24, enabling the VGL 26a to synchronize with the GMAC 16a and to begin reception of the packet data packet. In response to detection of the preamble, the GMII control 32 forwards the packet data (including preamble, header, payload data, and CRC field) to a selected one of the MII transmit buffers $34_i$. As described below, the GMII control 32, also referred to as a GMII media interface controller, includes arbitration logic 33 for selecting the transmit buffer $34_i$ for a corresponding 100 MB/s transmit path.

Figure 3:
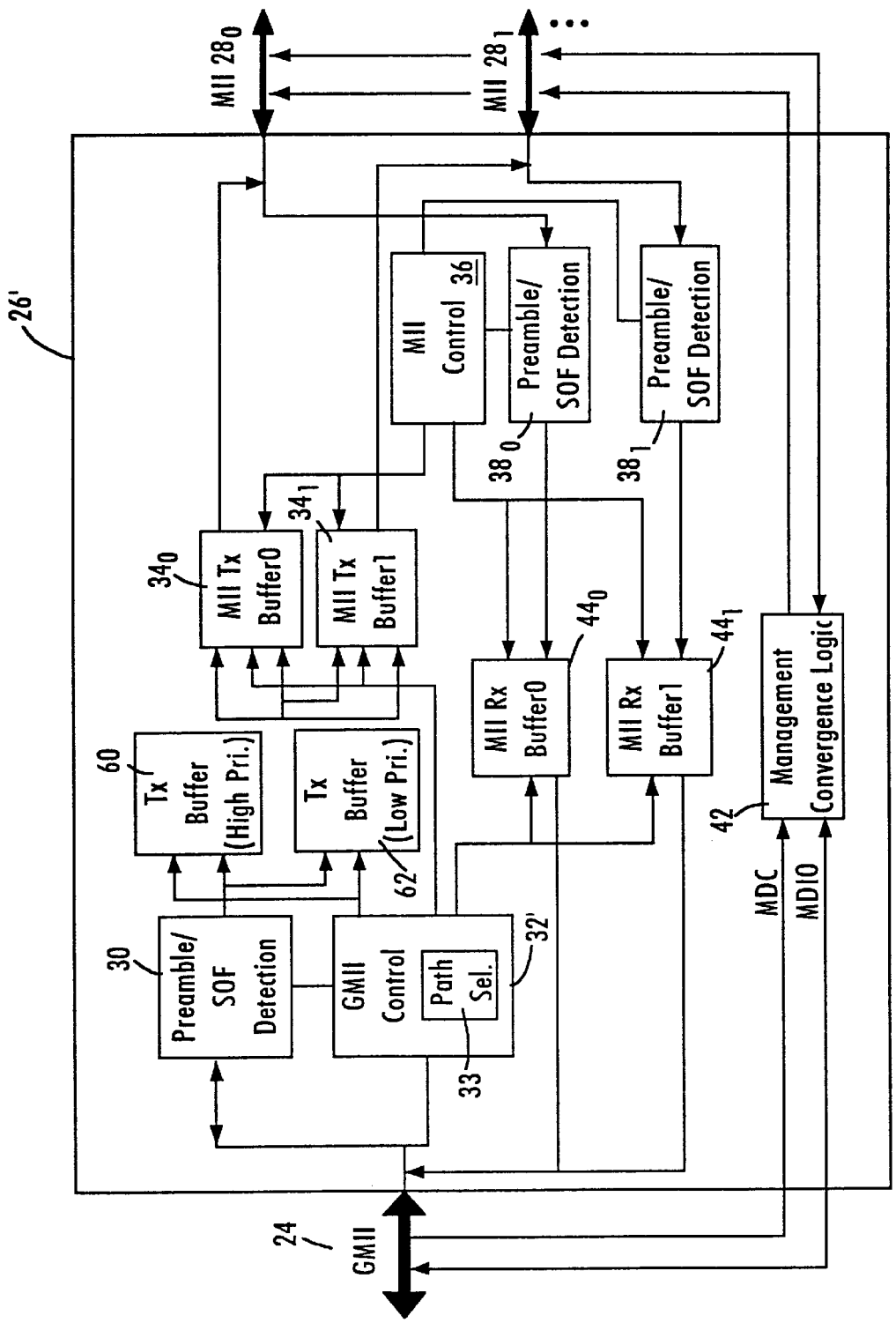
FIG. 3 is a block diagram illustrating the virtual gigabit layer for transmitting high priority frames and low priority frames across multiple physical layer links according to a second embodiment of the present invention.

The MII control 36, also referred to as an MII media interface controller, outputs a data frame in response to the stored data in the transmit buffer $34_i$ exceeding a prescribed threshold, shown as a dotted line in FIGS. 2 and 3. The MII control 36 also controls storing a received data frame from an MII $28_i$ in the corresponding MII receive buffer $44_i$. Once a predetermined minimum number of bytes are stored in a receive buffer $44_i$, as indicated by the dotted line, the GMII controller 32 outputs the data frame from the appropriate receive buffer $34_i$ to the GMAC 16 via the GMII 24.

Figure 4:
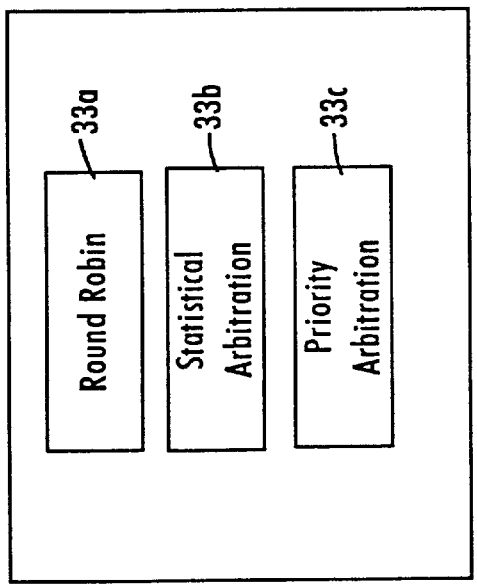
FIG. 4 is a block diagram illustrating the path selection arbitration logic of FIGS. 2 and 3.

The GMII control 32 controls transmission of a data frame received from the GMII 24 using the path selection arbitration logic 33 to select one of the transmit buffers 34$_i$. Specifically, FIG. 4 is a block diagram illustrating different arbitration logic schemes that may be used by the GMII control 32 in routing an incoming data frame from the GMII 24 to a selected one of the transmit buffers 34$_i$. The path selection arbitration logic 33 includes a least recently used arbitration portion such as a round-robin portion 33a, a statistical arbitration portion 33b, and a priority arbitration portion 33c. Typically, one of these arbitration logic portions will be selected during initial configuration of the network, depending upon the application. The round-robin arbitration logic 33a is configured to forward a received packet to the next successive transmit buffer 34$_i$ in a prescribed sequence. Alternatively, the arbitration logic 33a may be configured in a more general manner to supply the data frame to the least recently used transmit buffer 34$_i$, independent of the ordering of the transmit buffers or the respective MII links. The statistical arbitration logic 33b may be used to provide a more even distribution of data packets from a traffic management standpoint in the event that data packets have substantially different lengths. In this case, high level processing above the MAC layer (e.g., Transmission Control Protocol (TCP)) may be used to monitor the ordering of packets at a destination station. Finally, the priority arbitration logic 33c is used in the arrangement of FIG. 3 to determine a priority of a data frame received from the GMII 24. In this case, the priority arbitration 33c may determine the priority of the received data frame by different methods, including detecting a prescribed value in the header of the received data frame (e.g., from one of the fields 102, 104, 106, or 108 of FIG. 5), or by detecting a prescribed data pattern in the data field 110 shown in FIG. 5.

FIG. 3 is a block diagram illustrating the virtual gigabit layer 26a configured for transmitting high priority frames and low priority frames across multiple physical layer links according to an embodiment of the present invention. As shown in FIG. 3, the virtual gigabit layer 26' includes a plurality of transmit buffers 34 configured for storing data frames to be output to respective 100 MB media interface links 28, and a plurality of receive buffers 44 configured for storing data frames received from the respective 100 MB media interface links 28. As such, the receive path of FIG. 3 is identical to the receive path of FIG. 2.

FIG. 3 also includes a high priority transmit buffer 60 configured for storing data frames from the GMAC 16 via the GMII 24 that are identified by the priority arbitration logic 33c in the GMII controller 32' as having a high priority. The virtual gigabit layer 26' also includes a low priority transmit buffer 62 configured for storing data frames from the GMAC 16 via the GMII 24 identified by the priority arbitration logic 33c of the GMII control 32' as having a low priority.

The path selection arbitration logic 33 selects one of the transmit buffers 34$_i$ for transmission of data on the corresponding 100 MB media interface links 28 by first checking if the high priority transmit buffer 60 stores any data. If the high priority transmit buffer 60 has any stored data frames, or if the number of stored data bytes exceeds a prescribed minimum threshold, the GMII control 32' first outputs the contents of the high priority transmit buffer 60 into a selected one of the transmit buffers 34$_i$. For example, if the high priority transmit buffer 60 stores two data frames, the GMII control 32' may transfer the first high priority data packet from buffer 60 to transmit buffer 34$_0$, and transmit the second high priority data frame from buffer 60 to transmit buffer 34$_1$. Once the amount of stored data in the high priority buffer 60 falls below a certain prescribed threshold, the GMII control 32' will then transfer any data frames stored in the low priority buffer 62 to a selected one of the transmit buffers 34$_i$ using the least recently used arbitration, or statistical arbitration.

According to the disclosed embodiment, data frames can be transmitted between a high speed media interface link and selected lower-speed media interface links according to a path selection arbitration logic in a media interface to manage transmission and reception of the multiple data packets across the multiple lower-speed media interface links. Timing and synchronization is maintained by storing the data frames in respective buffers associated with the respective lower-speed media interface links, where a first media interface controller controls transmission and reception of data frames associated with the high speed media interface link, and a second media interface controller controls the transmission and reception of data frames across the multiple media interface links.

Although the disclosed embodiment has been described using a GMII-compliant PHY interface, IEEE 802.3z specifies that the GMAC may be connected to either the GMII-compliant PHY or an 8B/10B-compliant PHY, where 8B/10B encoding is done in the MAC. The disclosed VGL 26 may be modified for 8B/10B protocol by performing 8B/10B decoding of encoded transmit data from the GMAC 16 prior to storage in the Tx buffer 34, performing 8B/10B encoding of receive data prior to output from the Tx buffer 44 to the GMAC 16, and substituting the GMII interfaces 24 with the appropriate 8B/10B interfaces. Hence, the present invention encompasses the use of the alternative 8B/10B protocol.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of transferring a data frame output from a media access controller of an originating network node to a destination network node using a selected one of a plurality of first media interface links connecting the originating network node and the destination network node, comprising:

establishing a plurality of first media interface links each configured for transmitting data at a first data rate to respective physical layer links in communication with the same destination network node;

receiving the data frame in a media interface from the media access controller via a second media interface link at a second data rate higher than the first data rate and storing the data frame in one of a plurality of transmit buffers according to a path selection arbitration logic, each transmit buffer configured for storing data to be transmitted to the corresponding first media interface link; and transmitting the received data frame on the selected one of the first media interface links to the respective physical layer link in communication with the same destination network node according to the path selection arbitration logic in the media interface in response to a number of stored bytes in the one transmit buffer reaching a prescribed minimum threshold.

2. The method of claim 1, wherein the transmitting step further comprises detecting availability of the corresponding first media interface link.

3. The method of claim 2, wherein the storing step includes selecting, by the path selection arbitration logic, the one transmit buffer for storing the received data frame based on a least recently used arbitration among the transmit buffers.

4. The method of claim 3, wherein the selecting step comprises selecting the one transmit buffer using a round-robin arbitration as the least recently used arbitration.

5. The method of claim 1, wherein the storing step comprises:
   determining a priority of the data frame;
   selectively storing the data frame in one of a high priority buffer and a low priority buffer based on the determined priority; and
   outputting the data frame from the corresponding priority buffer to the one transmit buffer based on the determined priority relative to data stored in the high priority buffer.

6. The method of claim 5, wherein the priority determining step comprises reading header information in the data frame to identify the priority.

7. A method of transferring a data frame output from a media access controller of an originating network node to a destination network node using a selected one of a plurality of first media interface links connecting the originating network node and the destination network node, comprising:
   establishing the plurality of first media interface links each configured for transmitting data at a first data rate to a plurality of respective physical layer links in communication with the same destination network node;
   receiving the data frame in a media interface from the media access controller via a second media interface link at a second data rate higher than the first data rate and storing the data frame in one of a plurality of transmit buffers according to a path selection arbitration logic, each transmit buffer configured for storing data to be transmitted to the corresponding first media interface link;
   transmitting the received data frame on the selected one of the first media interface links to the respective physical layer link in communication with the same destination network node according to the path selection arbitration logic in the media interface in response to a number of stored bytes in the one transmit buffer reaching a prescribed minimum threshold;
   determining a priority of the data frame;
   selectively storing the data frame in one of a high priority buffer and a low priority buffer based on the determined priority; and
   outputting the data frame from the corresponding priority buffer to the one transmit buffer based on the determined priority relative to data stored in the high priority buffer, wherein
   the priority determining step comprises reading payload data information in the data frame to identify the priority.

8. The method of claim 1, wherein the receiving step comprises:
   determining a priority of the data frame;
   selectively storing the data frame in one of a high priority buffer and a low priority buffer based on the determined priority;
   first outputting high priority stored in the high priority buffer to an available one of a plurality of transmit buffers according to the path selection arbitration logic, each transmit buffer configured for storing data to be transmitted to a corresponding one of the media interface links;
   second outputting low priority data stored in the low priority buffer to an available second of the transmit buffers, according to the path selection arbitration logic, after a number of stored bytes in the high priority buffer fall below a prescribed threshold.

9. The method of claim 1, wherein the receiving step comprises receiving the data frame from the second media interface link at a one gigabit per second data rate as the second data rate.

10. The method of claim 9, wherein the transmitting step comprises transmitting the received data frame on the one first media interface link at a 100 megabit per second rate as the first data rate.

11. The method of claim 1, further comprising:
   receiving, into the media interface, transmitted data frames from each of the first media interface links;
   storing the transmitted data frames received from each of the first media interface links into a corresponding receive buffer; and
   transferring the stored transmitted data frames from each of the receive buffers to the media access controller via the second media interface link after a prescribed minimum amount of data is stored in the corresponding receive buffer.

12. The method of claim 2, wherein the one first media interface link is selected by the path selection arbitration logic based on the corresponding availability of the one first media interface link.

13. An apparatus for transmitting a data frame received from a media access controller via a first media interface link at a first transmission rate, comprising:
   a plurality of transmit buffers configured for storing data to be output to a respective plurality of second media interface links, the second media interface links each configured for sending and receiving data at a second data rate less than the first data rate;
   a first media interface controller having path selection arbitration logic for selectively storing the received data frame in a selected one of the transmit buffers; and
   a second media interface controller configured for outputting the data stored in each of the transmit buffers based on a corresponding number of stored bytes exceeding a prescribed threshold and an availability of the corresponding second media interface link.

14. The apparatus of claim 13, further comprising:
   a high priority transmit buffer configured for storing data frames from the media access controller identified by the first media interface controller as having a high priority; and
   a low priority transmit buffer configured for storing data frames from the media access controller identified by the first media interface controller as having a low priority;
   wherein the first media interface controller controls output from the high priority transmit buffer to at least one of the transmit buffers prior to output from the low priority transmit buffer to the transmit buffers.

15. The apparatus of claim 13, further comprising a plurality of receive buffers.

16. The apparatus of claim 13, wherein the path selection arbitration logic selects the one transmit buffer according to a least recently used arbitration.

17. The apparatus of claim 16, wherein the path selection arbitration logic uses a round-robin scheme as said least recently used arbitration.

18. The apparatus of claim 13, further comprising management convergence logic configured for transmitting management data information between the first media interface link and the second media interface links.

* * * * *